(12) United States Patent
Freeman

(10) Patent No.: US 9,943,959 B2
(45) Date of Patent: Apr. 17, 2018

(54) MAP LOCALIZING WITH PARTIALLY OBSTRUCTED RANGING DEVICES FOR AUTONOMOUS ROBOTS AND VEHICLES

(71) Applicant: DISNEY ENTERPRISES, INC., Burbank, CA (US)

(72) Inventor: Kyle G. Freeman, Agoura, CA (US)

(73) Assignee: Disney Enterprises, Inc., Burbank, CA (US)

( * ) Notice: Subject to any disclaimer, the term of this patent is extended or adjusted under 35 U.S.C. 154(b) by 46 days.

(21) Appl. No.: 15/137,735

(22) Filed: Apr. 25, 2016

(65) Prior Publication Data

US 2017/0305013 A1    Oct. 26, 2017

(51) Int. Cl.
*G05B 19/04* (2006.01)
*B25J 9/16* (2006.01)

(52) U.S. Cl.
CPC ........... *B25J 9/1664* (2013.01); *B25J 9/1697* (2013.01); *Y10S 901/01* (2013.01); *Y10S 901/47* (2013.01)

(58) Field of Classification Search
CPC ..... B25J 9/1664; B25J 9/1697; Y10S 901/01; Y10S 901/47
See application file for complete search history.

(56) References Cited

U.S. PATENT DOCUMENTS

| | | | |
|---|---|---|---|
| 5,696,892 A | * | 12/1997 | Redmann ................. G06T 13/20 345/473 |
| 6,374,155 B1 | | 4/2002 | Wallach et al. |
| 7,689,321 B2 | | 3/2010 | Karlsson |
| 7,706,600 B2 | * | 4/2010 | Kreeger .................... G06T 7/64 345/419 |
| 8,244,458 B1 | | 8/2012 | Blackburn |
| 8,577,538 B2 | | 11/2013 | Lenser et al. |

(Continued)

FOREIGN PATENT DOCUMENTS

WO    2014190208 A2    11/2014

OTHER PUBLICATIONS

Aufrere, et al, "Perception for Collision Avoidance and Autonomous Driving," The Robotics Institute, Carnegie Mellon University, 2003.

(Continued)

*Primary Examiner* — Ian Jen
(74) *Attorney, Agent, or Firm* — Marsh Fischmann & Breyfogle LLP; Kent A. Lembke

(57) ABSTRACT

A method for localizing robots and other objects when ranging devices are partially obstructed. The method includes retrieving a digital map of the space and then identifying potential locations for the object in the space. The method involves generating a prediction of expected ranges between the object and surfaces in the space at each of the potential locations. The method includes operating a ranging device to measure ranges to the surfaces in the space and comparing, for each of the predictions, the measured ranges with the expected ranges to identify the most accurate prediction. The comparing includes weighting ranges that are too small neutrally as these are strikes on obstructions, weighting ranges that provide matches positively, and weighting ranges that are too large negatively, and the comparing then involves summing the weighted ranges to identify a most accurate one of the predictions and associated current location for the object.

18 Claims, 4 Drawing Sheets

(56) References Cited

U.S. PATENT DOCUMENTS

| | | |
|---|---|---|
| 8,706,298 B2 | 4/2014 | Goulding |
| 8,831,778 B2 | 9/2014 | Pitzer |
| 8,948,955 B2 | 2/2015 | Zhu et al. |
| 2009/0006051 A1* | 1/2009 | Zhou .................... G06T 15/506 703/5 |
| 2014/0129027 A1* | 5/2014 | Schnittman .......... G05D 1/0219 700/253 |
| 2014/0277718 A1 | 9/2014 | Izhikevich et al. |
| 2015/0012209 A1* | 1/2015 | Park ....................... G01C 21/20 701/408 |
| 2015/0127149 A1 | 5/2015 | Sinyavskiy et al. |
| 2015/0205299 A1 | 7/2015 | Schnittman |
| 2015/0228077 A1* | 8/2015 | Menashe ................ G01S 5/163 382/103 |
| 2015/0306761 A1 | 10/2015 | O'Connor et al. |
| 2015/0316930 A1* | 11/2015 | Karlsson ................ G01C 21/12 701/28 |
| 2015/0355638 A1 | 12/2015 | Field et al. |
| 2017/0083023 A1* | 3/2017 | Park .................... G05D 1/0219 |

OTHER PUBLICATIONS

Liu, et al, "The Role of Model Fidelity in Model Predictive Control Based Hazard Avoidance in Unmanned Ground Vehicles Using Lidar Sensors," Proceedings of the ASME 2013 Dynamic Systems and Control Conference, Oct. 21-23, 2013.

\* cited by examiner

MAP LOCALIZING WITH PARTIALLY OBSTRUCTED RANGING DEVICES FOR AUTONOMOUS ROBOTS AND VEHICLES

BACKGROUND

1. Field of the Description

The present description relates, in general, to software and hardware systems for providing safe movement of autonomous objects such as robots, vehicles, and the like, and, more particularly, to a method and controller (or control system) for providing localization of an autonomous object as it moves about a space with one or more obstructions between the object and mapped objects (e.g., people milling about a robot as it moves through a mapped space defined by interior or exterior walls and other fixed objects).

2. Relevant Background

There is a growing use of autonomous objects such as robots, vehicles, household appliances (e.g., vacuums), and so on that include an onboard controller operating in a real time manner to navigate the autonomous object about a space. It is desirable for the controller to be able to safely navigate about this space, such as a vehicle along a street, even though the space may have objects that are not fixed in location and that may obstruct the view of the autonomous object's navigational devices to fixed objects, such as building walls, defining the space.

For example, it may be desirable to provide a mobile robot in a space that may also be populated with many people who are moving about the space and may even be interacting with the robot. The robot may be configured to be autonomous (e.g., not under continuous manual control). For safe and/or desired movement through the space (e.g., travel along a desired path from an origin to a destination), the controller of the robot has to be able to determine its present location in a mapped space, and this involves determining the space (among many mapped spaces) and also its present location in that space (its coordinates within the space).

However, localization (or a localizing process) has proven to be a difficult challenge for many autonomous objects. For example, autonomous vehicles may use a GPS (Global Positioning System) device for localization. However, a GPS receiver requires an unobstructed line of sight to a number of GPS satellites that may be compromised by city buildings and obstructions such as tree canopies, and GPS navigational accuracy is limited to several meters that may not provide adequate localizing for safe movement through a space such that additional localizing equipment typically will be provided in the vehicle.

An autonomous robot (or other objects such as autonomous vehicles) may be equipped with navigational tools such as a LIDAR (Light Detection and Ranging) or other device ("ranging device") capable of sampling ranges to fixed objects (such as walls of a building) that have been used to generate a map of the space. However, localizing the robot may be very difficult when the robot is used in a space with movable or moving obstructions including people moving about the space and people moving objects in the space (e.g., a chair may be moved over time, a stack of boxes may be moved to a new position, and so on). This produces a view-obstructed situation that results in the ranging device obtaining fewer ranging measurements as its sampling beams (light rays) actually hit mapped walls or objects and as the obstructions (e.g., people interacting with or passing by the robot) block the sampling beams. This can result in the robot not being able to accurately determine its current location within a space or even, in some cases, in the robot not being able to determine which space it is presently traveling through, and, hence, the controller typically will operate to simply halt movement of the robot until its ranging device no longer has an obstructed "view" of the space.

Present localization techniques are often not successful in localizing an autonomous object in a space with obstructions. In robot applications, a common localizing approach is for the robot's navigation tools to include LIDAR, and the LIDAR device is operated to gather a point cloud of ranges (or distances from the robot) about the robot (e.g., a 360-degree rotation of the LIDAR device) to surfaces of nearby (or even fairly distal) objects. Once the point cloud is collected, the localizing proceeds with adding up the distances of each point in the cloud to the closest map point (point on a surface of a fixed object in the map of the space). The smallest combined distance is the most likely location in the map. However, if the combined distances are too large, this localizing method is assumed to have failed to localize the robot. Such a localizing technique typically utilizes rectangular coordinates and equally weights every match or comparison with the mapped object.

In practice, this approach often fails to provide accurate localization when the LIDAR is obstructed (e.g., beams from its laser or lasers are blocked) such as when people are located in the space between the robot and mapped structures. Hence, there remains a need for an improved method of localizing an autonomous object such as a robot, a vehicle, an appliance, or the like when the autonomous object moves through a space with objects (e.g., people, movable features, and other obstructions) that may partially obstruct ranging devices.

SUMMARY

Briefly, a localizing method is taught herein that overcomes problems with partially obstructed ranging devices on an autonomous object such as a robot, a vehicle, an appliance, or the like. In the localizing method, all collected data from the ranging device(s) is not treated equally as was the case with prior point cloud solutions. Instead, actual or measured ranges that are too small, when compared with predicted values in each of a plurality of ray casting predictions for a number of likely positions for the autonomous object, are ignored (or treated neutrally) as these likely are associated with the ranging devices signals (e.g., lasers from a LIDAR device) striking an obstruction rather than a mapped surface. Further, weighting may be applied to the measured ranges such as positive weighting for matches with predicted values and negative weighting when the actual range is greater than that predicted. Then, the localizing method may include summing the weighted range values, and the prediction with the greatest sum may be identified as the most accurate for use in generating localization information (e.g., a current location of the autonomous object in a space as well as heading coordinates).

More particularly, a method is described for localizing an object in a space. The method includes retrieving from data storage a digital map of the space (e.g., from memory provided on the object which may be a robot, a vehicle, or the like). The method then includes, with a localizing module run by a controller (e.g., a controller executing code or instructions provided in a computer-readable media on the object), identifying a plurality of potential locations for the object in the space (such as with a GPS or similar device on the object). The method then involves, with the localizing module based on the digital map, generating a prediction of expected ranges between the object and surfaces in the space at each of the potential locations. The method then may include operating a ranging device(s) to measure ranges to the surfaces in the space. Then, the localizing module may compare, for each of the predictions, the measured ranges with the expected ranges to identify one of the predictions as an accurate prediction. The method then includes generating localizing data including a current position of the object in the space from the one of the predictions identified as the accurate prediction.

In practice, the comparing step typically includes weighting each of the measured ranges based on a comparison with a corresponding one of the measured ranges from the ranging device. The weighting may include treating neutrally (e.g., multiplying by zero or the like) the measured ranges that are smaller than the corresponding ones of the measured ranges, whereby strikes from the ranging devices with obstructions in the space are identified for the comparing and ignored as not being useful for determining the objects current location in the space. The comparing step may include summing the weighted measured ranges, and the weighting step may include positively weighting the measured ranges when the expected range matches the corresponding one of the measured ranges. Further, the weighting step may include negatively weighting the measured ranges when the corresponding one of the measured ranges is greater than the expected range. To make the localizing more efficient, the expected ranges and the measured ranges can be provided using polar coordinates.

DETAILED DESCRIPTION OF THE PREFERRED EMBODIMENTS

Figure 1:
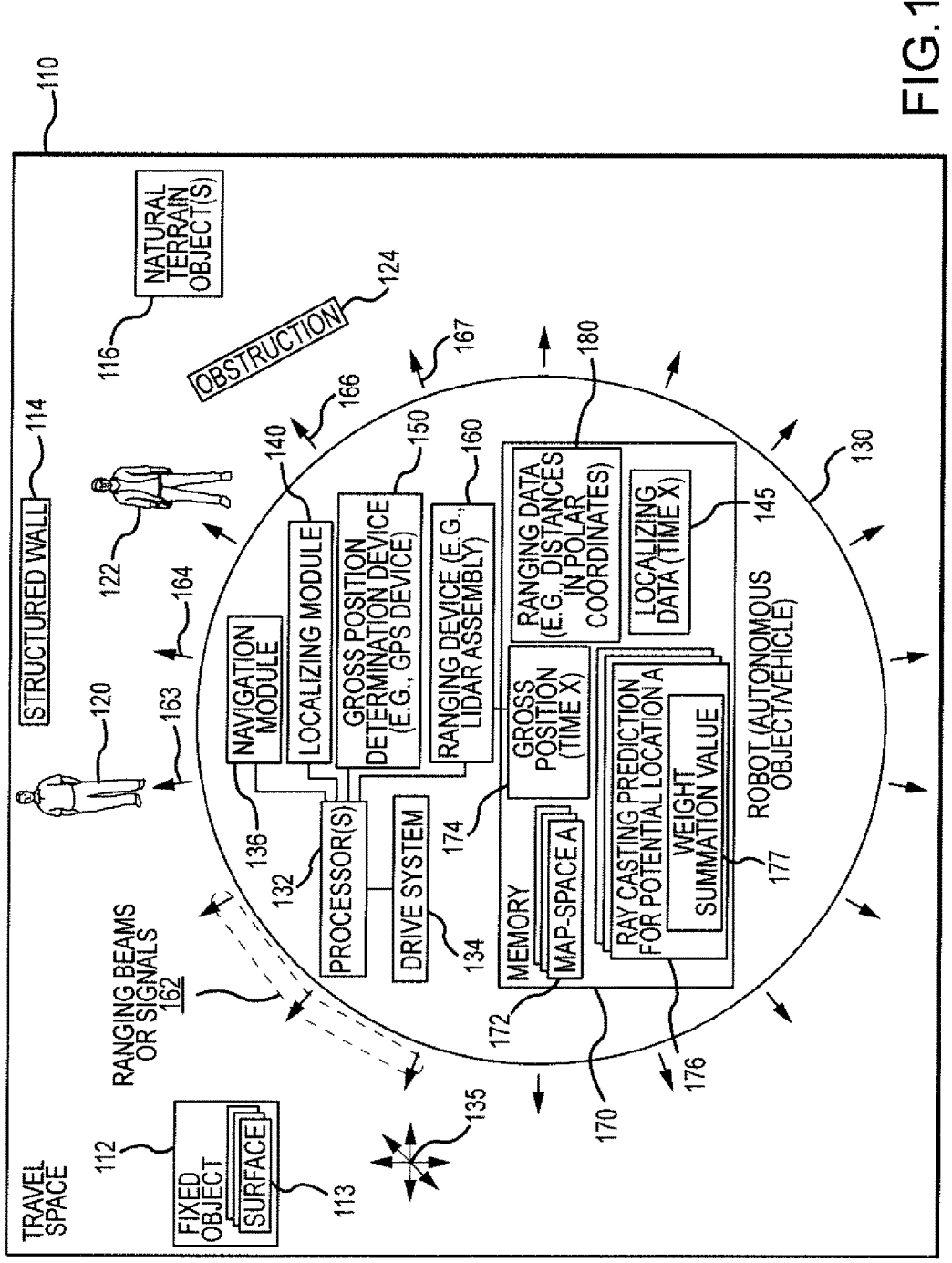
FIG. 1 is a functional block diagram of an autonomous object in the form of a robot configured to perform/implement the localizing method of the present description while traveling through a space with obstructions.

Briefly, a localization method (or localizing program) is taught herein that may be implemented by a controller of an autonomous object such as an autonomous vehicle, appliance, robot, or the like to obtain localization information. In some of the examples provided, an autonomous robot uses a controller to run software or executable instructions (or code) to use this localization method to determine both a present location in a mapped space and a heading (which indicates which direction the robot is presently traveling or "facing"). The localization information is then fed within the controller to the navigational or motion control module (or program) that uses this information to safely and accurately control movement of the robot through the space such as from a current position (or origin) to a second, new position (or a destination).

The localization method was created by the inventor with the understanding that prior localizing processes often will result in a failure to localize under obstructed conditions. To avoid the problems with prior processes, the inventor's localization method involves ray casting and comparing the range in polar coordinates. This may involve making a series of ray cast predictions from the perspective of the LIDAR device (or other ranging device). The predictions are then processed to apply weighting to improve accuracy and the speed in which localizing can be completed instead of treating every collected data point (each distance or range value) equally or as being accurate for the present space and potentially obstructed environment.

For example, the predictions are weighted negatively if the actual data goes further (e.g., the LIDAR device senses a surface that is farther away (a greater distance/range) from the robot than it should be based on the predictions). In the same or other implementation of the localizing method, predictions are not weighted (are treated neutrally) if the actual data falls short (e.g., the LIDAR device senses a surface that is closer (a smaller distance/range) to the robot than it should be based on the predictions). These LIDAR device outputs indicate that the LIDAR device is or may be obstructed such as with a person or other obstruction between the robot's LIDAR device and a structural surface in the mapped space.

With such weighting, the localizing method is able to select the prediction with the best weight and accurately localize the robot (or other autonomous object) with only a percentage of the LIDAR device's beams making it through the obstructions and onto the mapped surfaces in the present space (e.g., with only a number of the collected ranges or distances being representative to the space at any particular point in time in the obstructed conditions). This localizing technique works in 2D and provides X, Y, and heading coordinates, and it also works in 3D to provide X, Y, and Z coordinates as well as yaw, pitch, and roll data.

When implemented, the ray casting results can be reused when testing various headings. In simulations and testing, the new localizing method has provided performance comparable to the common point cloud alignment method but without the obstruction problem that had caused localization failures. Stated differently, the localizing method taught herein is much more likely to produce localization information (present location (in X and Y coordinates or in X, Y, and Z coordinates) and heading) in all environments including when the autonomous robot (or other object/vehicle) travels through a space with one-to-many obstructions. By ray casting from the perspective of the ranging device, seeing too far, such as through a wall, can be weighted highly negatively while an obstruction causes the range to fall short, which can be treated neutral in the weighting process. This makes for a localizing solution far more resistant to obstructions, such as people, in a space and results in far more reliable localizing under obstructed conditions.

FIG. 1 is a functional block diagram of an autonomous object 130 in the form of a robot configured to perform/implement the localizing method of the present description while traveling through a space with obstructions. As shown, the robot 130 is located in and traveling through a space 110, and the space 110 includes fixed objects 112 with surfaces 113 along with structural surfaces or walls 114 and natural terrain objects or geographic landmarks 116 all that may be typically useful in localizing the robot 130 within the space 110, e.g., for obtaining a current location or position (2D or 3D position) and heading (which way is the robot 130 facing or presently traveling). However, the space 110 also includes people 120, 122 and other obstructions 124 (such as objects that have been moved into the space 110 since it was digitally mapped as reflected in a digital map 172) that may obstruct the "view" of ranging devices which, without the present localizing process, could cause localizing to fail for the robot 130.

The robot 130 includes a processor (or CPU) 132 that manages operation of a drive system 134 that is configured to operate to move (as shown with arrows 135) the robot 130 through the space 110. To this end, a navigation module 136 may be run or executed by the processor 132 to generate control signals for the drive system 134 such as to move from a current location (given by localizing data 145) in the space 110 to a destination or goal location/position in the space 110. To generate such control signals, the navigation module 136 takes as input localizing data 145 including 2D (or 3D, in some cases) location data and heading data.

In this regard, the processor 132 also executes or runs a localizing module 140 that functions to perform localizing as described herein to produce the localizing data 145 even with people 120, 122 and/or other obstructions 124 being present in the travel space 110. To support the operations of the localizing module 140, the robot 130 is shown to include a gross position determination device 150, which may take the form of a GPS or similar device, that operates to generate a seed position or location (or lower accuracy determination of localization data) that is shown to be stored at 174 by the processor 132 in memory 170 of the robot 130. With a GPS-based device 150, it will be appreciated that the position 174 at a particular time (shown as "Time X" in FIG. 1) may be inaccurate by several meters or the GPS signals may be blocked forcing the device 150 (or another device in robot 130 may provide this first guess of location) to use other processes to provide the gross or seed position 174. However, this seed position 174 is accurate enough to allow the localizing module 140 to determine the present space 110 in which the robot 130 is traveling.

The memory 170 is shown to store a set or plurality of digital maps 172 of spaces in which the robot 130 may be located during its operations. Each of the maps 172 includes representations of each of the fixed or structural objects (such as objects 112, 114, 116) in that space that can be used as part of a localizing process. During each localizing cycle (e.g., localizing may be performed on a relatively frequent basis, which may be set or defined based on processing abilities of processor 132 and available power (e.g., from a battery on the robot 130 not shown in FIG. 1) with one embodiment updating localization information 145 at a rate of 60 times/second), the localizing module 140 acts to choose a map 172 based on the gross position 174 determined by the device 150 at the present time (or using the most recent gross position value 174).

With the chosen digital map 172, the localizing module 140 then acts to generate, for each of a plurality of potential or likely locations (and headings) (as indicated by the label "A" and use of multiple data boxes shown in FIG. 1) based on the gross seed or initial position 174, a ray casting prediction 176. For example, the seed position 174 may be used with the map 172 to perform ray casting from the point of view of the ranging assembly 160 (e.g., from the perspective of a LIDAR device) on the robot 130 to surfaces in the map 172 (e.g., to structure surfaces such as to walls of buildings, to surfaces of hillside, large rock, or other geographic object, and so on), which defines a ray casting prediction defining expected ranges or distances of objects/surfaces if the robot is actually located in the seed position 174. Similarly, ray casting predictions 176 are generated by the localizing module 140 for numerous other likely or potential positions that are chosen based on the seed or initial gross position 174 (e.g., based on the known accuracy of the positioning device 150, the robot 130 may be at any of a number of positions/locations in an area (or volume) about the gross/seed position 174).

The robot 130 further includes a ranging device or assembly 160 that acts to generate ranging data 180 that includes distances or ranges between the robot 130 (e.g., a center of the robot 130 or its edges/outer surfaces in some cases) and surfaces of objects in the space 110 such as the surfaces 113 of fixed object(s) 112 and to facing surfaces of walls 114 and natural terrain objects 116. The ranging device 160 typically will be configured to transmit signals (e.g., light, sound, or the like) 162 in a 360-degree pattern about the circumference of the robot 130. In one embodiment, the ranging assembly 160 takes the form of one, two, or more LIDAR devices that rotate to provide 360-degree coverage (e.g., a pair of LIDAR devices provided on opposite sides of the robot 130 each providing 360-degree rotation or that together provide the 360-degree coverage of the space 110). As shown at 163, 166, some of the ranging signals/beams may be blocked by obstructions 120, 124 while other proximate signals or beams 164, 167 are not blocked by these same obstructions 120, 124 and are able to reach surfaces of objects 114, 116 behind the obstructions 120, 124, thereby allowing localizing as described herein to be successful. The localizing module 140 may convert the ranges/distances from the ranging assembly 180 to polar coordinates, if not provided in this form, to enhance the efficiency of calculations of localizing data 145.

The localizing module 140 then selects the most accurate one of the ray casting predictions 176 based on the ranging data 180, and uses this chosen prediction in providing the localizing data 145 (e.g., a 2D or 3D coordinates in the space 110 along with heading coordinates). To this end, the localizing module 140 compares each of the actual values in ranging data 180 to predicted values in the ray casting predictions 176 to determine which prediction 176 is most accurate. In some embodiments, the localizing module 140 applies weighting to the distances/ranges in the actual data 180, and the weighted results are added up or summed as shown at 177. The prediction 176 with the greatest summation value 177 may be considered the winner or the most accurate location prediction by the localizing module 140 and used to provide the localizing data 145.

For example, distances/ranges in the actual data 180 that match the predicted value in a prediction 176 may be weighted positively while actual values that are too small/short may be discarded (weighted to be neutral such as by making these have a zero value) and ones that are too great (actual data exceeds expected values in the predictions) are weighted negatively. This quickly identifies the ray casting prediction 176 with the most "hits" or matches while ignoring actual data associated with obstructions (such as people 120, 122 or other obstructions 124) and with "misses" (e.g., when a sensing signal, ray, beam, or wave 162 behaves in an unexpected manner based on the prediction 176 as may be the case when a ranging beam/signal passes out an opening in a wall or the like and strikes an object behind a mapped object viewable with the robot 130 in a particular position).

The summation value 177 may be generated in many well-known ways such as by generating a histogram, and the localizing module 140 may employ fuzzy logic to obtain the best match between the ray casting predictions and the actual ranging data 180, which may perform best if a predefined number of minimum hits/matches are obtained such as three (or more) so as to allow accurate triangulation of the position of the robot 130. The localizing data 145 is provided to the navigation module 136 for use in moving/navigating 135 the robot 130 in the space 110 in any of a number of ways that are known to those skilled in the art of moving an autonomous object through a space 110. If the robot's view is wholly or blocked to such a degree that localizing by the localizing module 140 is not possible, the navigation module 136 may operate in a predefined/default manner such as with no movement until obstructions such as people 120, 122 move and a more unobstructed view is available to the ranging assembly 160.

Figure 2:
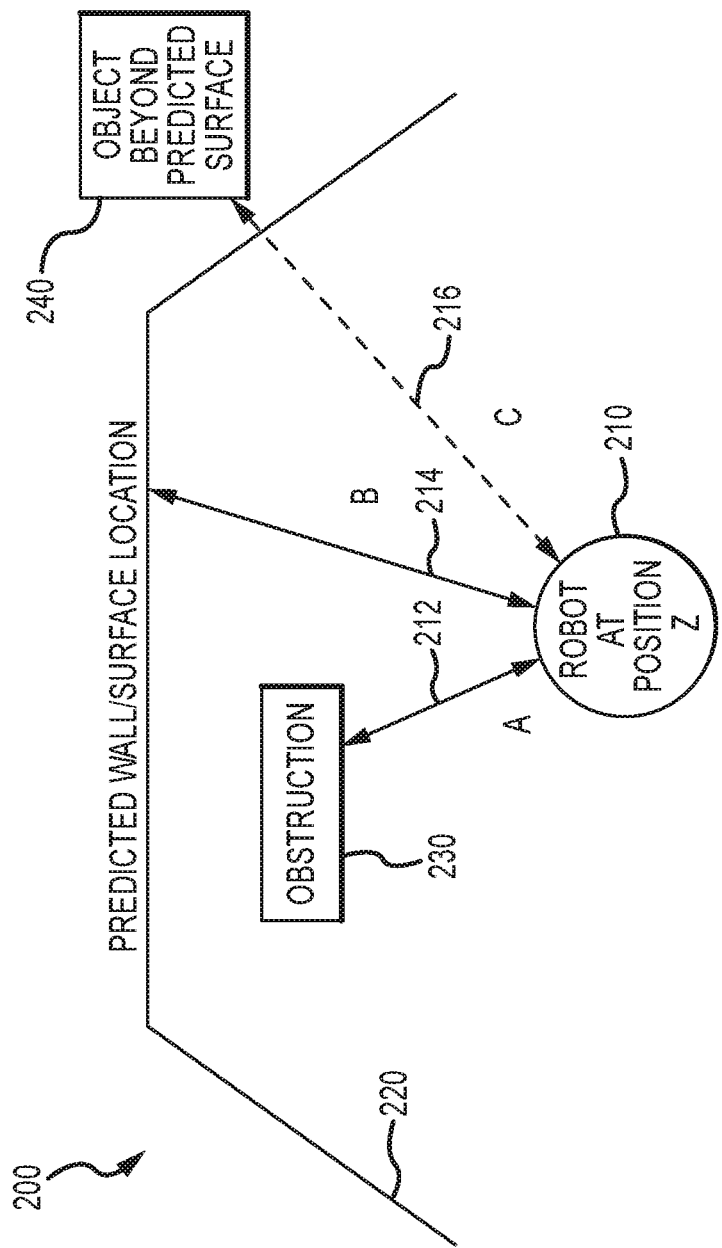
FIG. 2 is another functional block diagram illustrating localizing with obstructed ranging devices according to the present description.

The functional block diagram 200 of FIG. 2 is useful for further explaining how the localizing method of the present description may be implemented to localize an autonomous object. As shown, a robot 210 is positioned within a space at a potential position/location (e.g., associated with or defined by 2D or 3D coordinates and, typically, heading coordinates). A digital map of the space is used to generate a ray casting prediction that includes expected distances/ranges to mapped surfaces in the space with the robot 210 at this position. Particularly, line 220 represents a predicted location of a wall (or other surface) within the space relative to the position of the robot 210. If the ray casting prediction is correct, the actual data from a ranging device (e.g., a LIDAR device) should match predicted distances between the robot 210 and wall/surface location 220.

With the localizing method, a first actual ranging value or data point is shown at 212, which may correspond to a laser beam being transmitted and bounced back from an obstruction 230 instead of the true wall represented by line/surfaces 220. In the localizing method, the actual range/distance 212 indicates the ranging struck an object 230 in front of the location of the predicted structure or surface such that the ranging value (or distance) 212 is smaller or less than expected or predicted for the robot 210 in this position. The localizing method would, as a result of this comparison between actual data 212 and a predicted ranging value, make the value 212 neutral (e.g., assign a zero weight to this range value).

Further, in the localizing method, a second actual ranging value or data point is shown at 214, which may correspond with a laser beam being transmitted to and bounced back from the actual wall/surface associated with predicted location of wall shown with line 220. Since the ranging value 214 corresponds/matches a predicted distance to the object/wall surface 220, this ranging value 214 may be weighted positively to indicate the predicted position of the robot 210 shown in FIG. 2 has at least one "hit" or match with the mapping of the space (e.g., a one or greater weight may be assigned to this range value).

Next, a third actual ranging value or data point is shown at 216, which may correspond with a laser beam being transmitted to and bounced back from an object 240 beyond the location of the predicted wall/surface 220 from the map of the space. The localizing method may weight this value 216 negatively since the range 216 "strikes" an object past the prediction 220 (e.g., a negative one, two, or greater weight may be assigned to this range value). A prediction with numerous negative values will most likely not be chosen as a best prediction of the position of the robot 210 because the localizing method includes summing all the weights (based on area represented, for example) and identifying the prediction with the highest positive area or sum of weights as the most likely to provide the present location/position of the robot 210. Often, the actual values that are too long or large when compared with a prediction are weighted more negatively than matches are weighted positively as this allows the robot to be quickly oriented in a correct direction.

For example, the true present position of the robot 210 may be to the left of the one shown in FIG. 2 as this would provide a match for both ranging values 214 and 216 (while ranging value 212 would still be short of the predicted value and ignored or neutralized in the summation procedure). Again, the use of polar coordinates for the ranging values/distances 212, 214, 216 may be utilized to facilitate the comparison of the ranges/distances with the predicted values of ranges/distances to mapped objects in the space about the robot 210 (also, note, that many ranging devices such as LIDAR-based devices, output ranges using polar coordinates).

Figure 3:
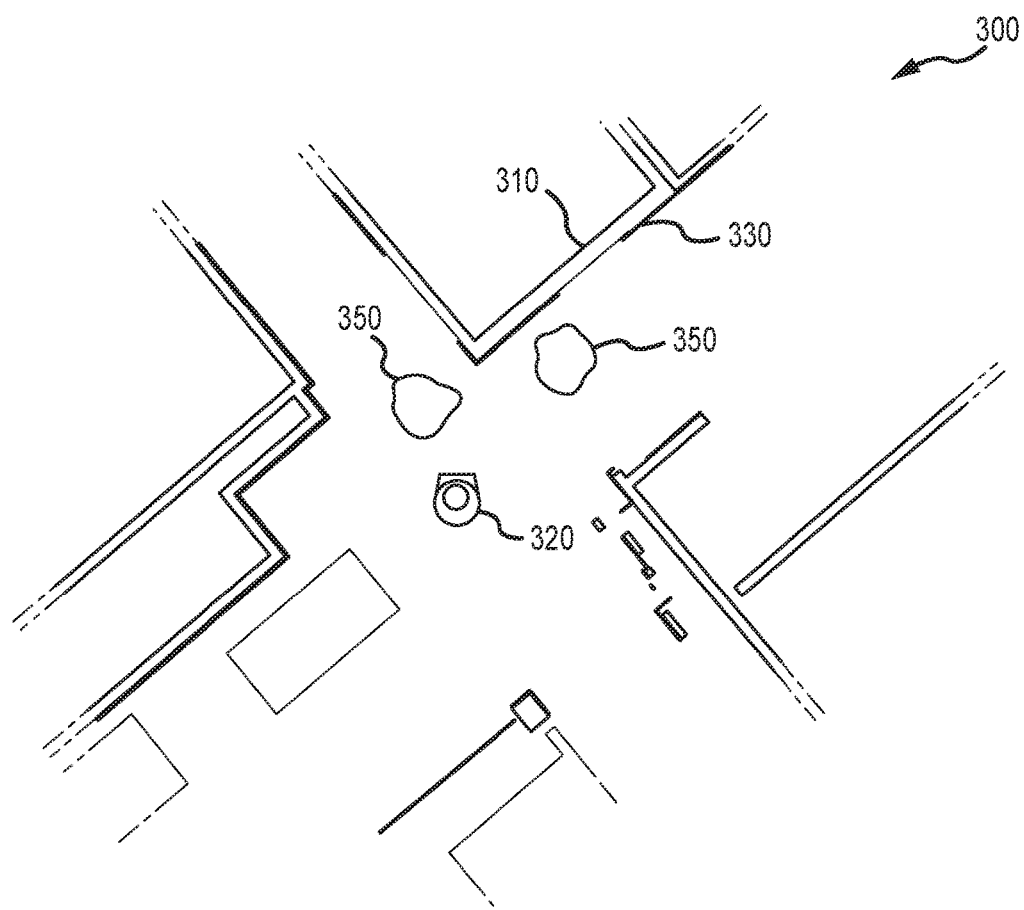
FIG. 3 is a top view of a mapped space showing use of ranging to localize an autonomous object.

FIG. 3 illustrates a top view of a mapped space 300 through which an autonomous object may travel and for which it may be desirable to perform localizing for this object. As shown, the space 300 includes a number of structural objects 310 such as buildings or interior walls with exposed and mapped surfaces. Particularly, these objects 310 define passageways (e.g., hallways, rooms, roads, and the like) through which a robot 320 is moving from a first position (origin) to a second position (destination), and it is useful to obtain localization information for the robot 310 on an ongoing basis.

Localizing may be difficult though due to the presence of one or more obstructions 350 that block the robot's view of the space's mapped structural objects 310 as shown in FIG. 3. The robot 320 includes a ranging device(s), such as a LIDAR device, that acts to scan the space 300 and obtain ranges to the structural objects 310 as is shown with the plurality of dots 330 (which may appear as a line as shown in FIG. 3) and which may be provided in polar coordinates relative to the ranging device and the robot 320. However, the obstructions 350 block the robot's view of portions of the surfaces of structure 310, which could result in a failure to complete localizing using prior localizing methods. The new localizing method discussed herein, though, is able to treat ranges associated with strikes on the obstructions 350 neutrally as having too small a range or distance from the robot compared with the anticipated location/distance to the structure 310 from the digital map of space 300. This allows the accurate strikes/ranges to structure 310 to still be fully considered (e.g., to be weighted positively), which allows the robot's position in the space 300 to be identified along with heading coordinates.

Figure 4:
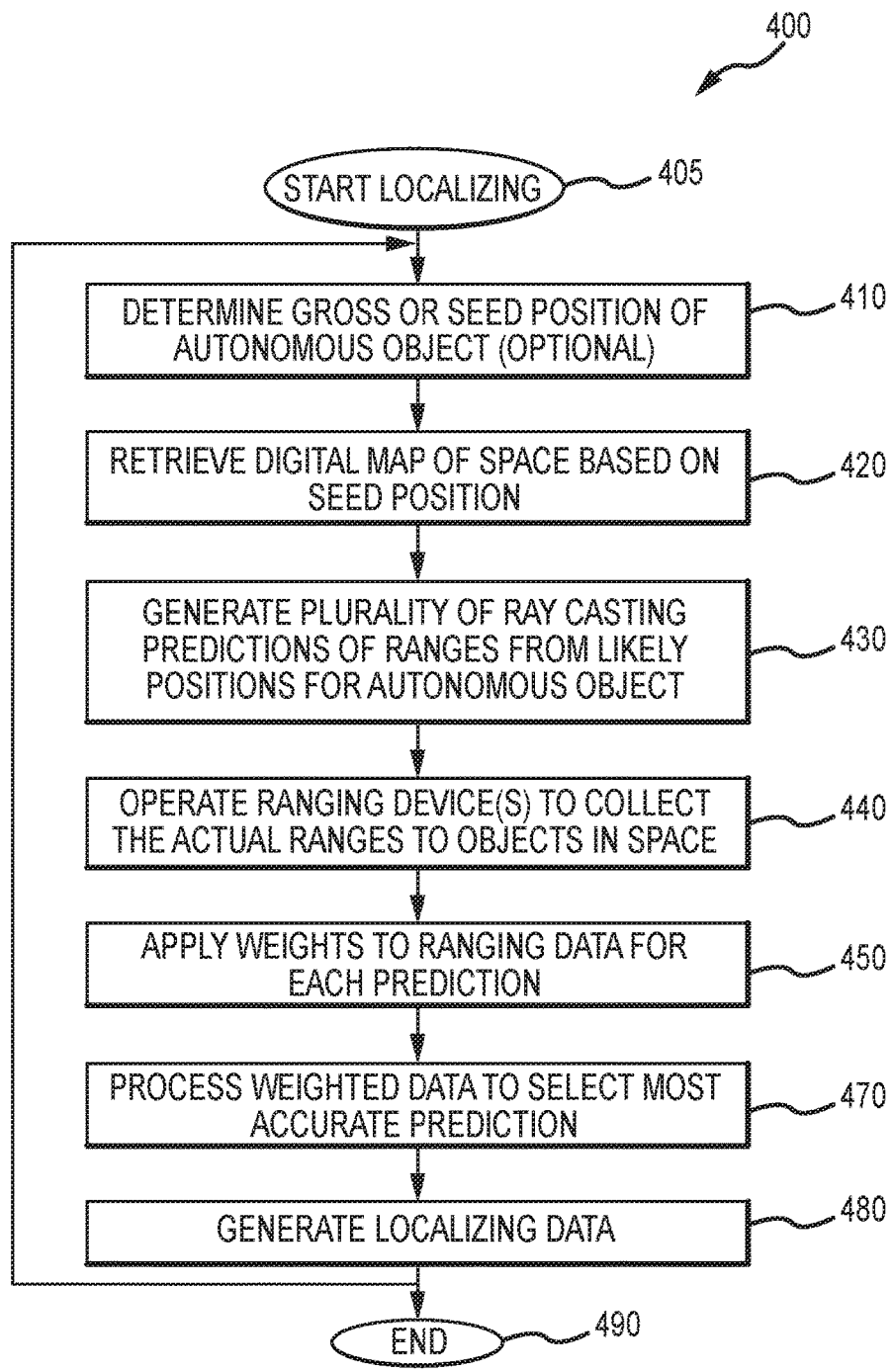
FIG. 4 is a flow diagram for a localizing method that may be performed such as during operation of the robot of FIG. 1.

FIG. 4 illustrates a localizing method 400 of the present description such as may be implemented by an autonomous object (or its controller hardware and software) such as the robot 130 of FIG. 1 via its localizing module 140. The method 400 starts at 405 such as with loading localizing software into a controller of an autonomous object, and, if not already provided on the autonomous object, installing a ranging device(s) (one or more LIDAR devices or the like) and/or a gross position determination assembly (e.g., a GPS device or the like).

The method 400 continues at 410 with determining an initial or seed position of the autonomous object. This may be manually input into the controller (e.g., by an operator feeding a location within a room of building, on a street of a city, on path in a theme park, and so on) and/or by selecting an appropriate digital map of a space for the present location of the autonomous object. In other cases, a gross seed position is determined such as with a GPS device, with the position being "gross" in that it may only be accurate within one-to-many meters rather than the much more accurate position needed/desired for localizing of the autonomous object.

The method 400 continues at 420 with the controller of the object retrieving from on or offboard memory a digital map of the space containing or corresponding with the gross seed position, and this map typically will define all vertical (or raised) surfaces of structures or objects in the space (at the time the map was created), and a ranging device typically will be positioned at one or more heights in the autonomous object such that it will be able to detect these structures with surfaces at or above the height of the ranging device(s). For example, a robot may contain two or more LIDAR devices that are at the same or differing heights in a robot and that rotate to gather ranging data in two or more horizontal planes about the robot's present position.

The method 400 continues at 430 with the controller (or other device/software) generating a large number of ray casting predictions. Each of these predictions is made from one of a plurality of likely positions for the autonomous object based on the determined gross seed position (e.g., a GPS device may provide an X-Y coordinates for a robot or vehicle in a space and other likely positions nearby or surrounding this seed position may be used for creating the ray casting predictions). Each prediction provides, in polar coordinates in some embodiments, predicted or expected ranges to nearby structures (in the digital map of the space) assuming the position chosen for the object is correct.

At 440, the method 400 involves operating one or more ranging devices to obtain or collect actual (measured) ranges of objects in the space about the autonomous object. The output of the LIDAR or other ranging devices may be in polar coordinates (but this is not required to implement method 400). As discussed above, obstructions may be present in the space between the autonomous object's ranging devices and surfaces of mapped structures/objects that may make a number of collected ranges smaller than would be expected in the absence of such view-blocking obstructions. In other words, the autonomous object may be traveling through an environment that produces partially obstructed ranging devices ("partially" because if wholly blocked localizing cannot be performed even with the present localizing method 400 as need three or more hits/matches to obtain triangulation of the current location of the autonomous object).

The method 400 continues at 450 with the controller using the localizing method to apply weight to the ranging data for each of the predictions from step 430. For example, positive weighting may be applied to ranges from the collected data that matches a predicted value while neutral weighting (e.g., multiply by zero) may be applied to ranges that are smaller than predicted because these ranges likely mean the ranging signal (e.g., a laser beam) has struck an obstruction (such as a person walking or standing by a robot). Additionally, negative weighting may be applied to ranges in the collected data that are greater than what is expected from the prediction as these values indicate that the position may be incorrect and negative weighting facilitates rapid identification and elimination of such erroneous predictions (and erroneous positions). For example, it may be predicted for a particular likely position that a wall should be 10 feet away at 90 degrees, but the actual data contains a strike at 15 feet at 90 degrees. This value is negatively weighted (and, in some cases, at a greater magnitude than the positive weighting being used) as the prediction clearly is not matching the actual data at this point.

At step 470, the weighted data is processed and a most accurate prediction is selected from the set of predictions generated at 430. For example, the weighted values may be summed, and the prediction with the largest summation of weighted values may be considered the most accurate. As one will be appreciated, all data is not treated equally as was the case with point cloud matching processes for localizing. Instead, strikes on obstructions are ignored or discarded while positive values indicate a likely good prediction and negative values quickly reduce the indication that a prediction could be a good one.

The method 400 continues at 480 with generating localizing data such as 2D or 3D coordinates for the object in the space (which may be fed to a navigation module for use in controlling movement/operations of the autonomous object in the space) as well as heading coordinates. The method 400 may end at 490 or may continue at step 410, and localizing 400 may be performed in a repeated manner such as 30 to 60 (or more) times per second to output accurate position and heading information.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of localizing an autonomous object in a space, comprising:
   retrieving from data storage a digital map of the space;
   with a localizing module run by a controller, identifying a plurality of potential locations for the autonomous object in the space;
   with the localizing module based on the digital map, generating a prediction of expected ranges between the autonomous object when at each of the potential locations and surfaces in the space, wherein the generating of the predictions includes generating a ray casting prediction from the autonomous object to the surfaces in the space;
   operating a ranging device to measure ranges between the autonomous object and the surfaces in the space; and
   comparing, for each of the predictions, the measured ranges with the expected ranges to identify one of the predictions as an accurate prediction,
   wherein the comparing includes weighting each of the measured ranges based on results of the comparing.

2. The method of claim 1, further comprising generating localizing data including a current position of the autonomous object in the space from the one of the predictions identified as the accurate prediction.

3. The method of claim 1, wherein the weighting includes treating neutrally the measured ranges that are smaller than the corresponding ones of the expected ranges, whereby strikes from the ranging devices with obstructions in the space are identified for the comparing.

4. The method of claim 1, wherein the comparing includes summing the weighted measured ranges and wherein the weighting includes positively weighting the measured ranges when the expected range matches the corresponding one of the measured ranges.

5. The method of claim 4, wherein the weighting further includes negatively weighting the measured ranges when the corresponding one of the measured ranges is greater than the expected range.

6. The method of claim 5, wherein the negative weighting is greater than the positive weighting.

7. The method of claim 1, wherein the expected ranges and the measured ranges are provided using polar coordinates.

8. A localizing method, comprising:
   determining a plurality of potential locations of an autonomous object;
   from each of the potential locations, generating a ray casting prediction defining predicted ranges from the autonomous object to surfaces in a space based on a digital map of the space;
   measuring ranges to the surfaces in the space;
   identifying the measured ranges corresponding with obstructions in the space;
   for each of the ray casting predictions, summing all of the measured ranges except the measured ranges identified as corresponding with the obstructions;
   selecting one of the ray casting predictions as most accurate based on the summing; and
   determining localizing data for the autonomous object in the space using the selected one of the ray casting predictions.

9. The method of claim 8, further including, prior to the summing, positively weighting the measured ranges matching corresponding ones of the predicted ranges and negatively weighting the measured ranges that are greater than corresponding ones of the predicted ranges.

10. The method of claim 9, wherein the measured ranges that are greater than corresponding ones of the predicted ranges are weighted more heavily negative than the measured ranges that match the corresponding ones of the predicted ranges are weighted in a positive manner.

11. The method of claim 8, wherein the measuring of the ranges is performed 360 degrees about the autonomous object by at least two LIDAR devices.

12. The method of claim 10, wherein the ray casting predictions are performed from locations of the LIDAR devices on the autonomous object.

13. The method of claim 8, further comprising determining a seed location for the autonomous object and wherein the determining of the potential locations is performed using the seed location and wherein the digital map includes the seed location.

14. An autonomous object configured for accurate localizing, comprising:
   a controller;
   a localizing module run by the controller, wherein the localizing module determines a plurality of potential locations for the autonomous object in a space and wherein the localizing module generates a prediction of expected ranges between the object and surfaces in the space for each of the potential locations; and
   a ranging assembly collecting ranging data about the autonomous object,
   wherein the localizing module compares, for each of the predictions, the ranging data with the expected ranges to identify one of the predictions as an accurate prediction, and
   wherein the comparing by the localizing module includes weighting measured ranges in the ranging data based on a comparison with a corresponding one of the expected ranges.

15. The object of claim 14, wherein the weighting includes treating neutrally the measured ranges that are smaller than the corresponding ones of the measured ranges, whereby strikes from the ranging devices with obstructions in the space are identified for the comparing.

16. The object of claim 14, wherein the comparing includes summing the weighted measured ranges and wherein the weighting includes positively weighting the measured ranges when the expected range matches the corresponding one of the measured ranges.

17. The object of claim 16, wherein the weighting further includes negatively weighting the measured ranges when the corresponding one of the measured ranges is greater than the expected range.

18. The object of claim 16, wherein the autonomous object comprises a robot or a vehicle and wherein the ranging assembly includes at least one LIDAR device.

* * * * *